United States Patent [19]

Klees et al.

[11] 4,046,415
[45] Sept. 6, 1977

[54] BODY MOUNT SYSTEM FOR A MOTOR VEHICLE

[75] Inventors: Gerard T. Klees, Rochester; Robert A. Meacham, St. Clair Shores; Harry M. Ruby, Walled Lake; Edward Sich, St. Clair Shores, all of Mich.

[73] Assignee: General Motors Corporation, Detroit, Mich.

[21] Appl. No.: 675,174

[22] Filed: Apr. 8, 1976

[51] Int. Cl.² ............................................. B62D 23/00
[52] U.S. Cl. .............................. 296/35 R; 180/64 R; 248/358 R; 267/63 A; 280/106 R
[58] Field of Search ................... 296/35 R; 180/64 R, 180/64 L, 64 M; 280/106 R; 248/9, 15, 22, 358 R; 267/63 A, 153

[56] References Cited

U.S. PATENT DOCUMENTS

| | | | |
|---|---|---|---|
| 2,129,124 | 9/1938 | Geyer | 248/9 |
| 2,171,947 | 9/1939 | Parker | 296/35 |
| 2,903,208 | 9/1959 | Everitt | 248/9 |
| 3,395,769 | 8/1968 | Julien | 180/64 R |
| 3,722,939 | 3/1973 | Church | 267/63 A |
| 3,881,767 | 5/1975 | Klees | 296/35 R |

*Primary Examiner*—Robert R. Song
*Assistant Examiner*—John A. Carroll
*Attorney, Agent, or Firm*—Charles E. Leahy

[57] ABSTRACT

A body mount system for a motor vehicle includes individual elastomeric body mounts which act between the radiator support and the forward end of sub-frame side rails, between the bulkhead structure of a unitary frame-body and the center portion of sub-frame side rails, and between the unitary frame-body and the rearward end of the sub-frame side rails. Each of these body mounts has an elastomeric element which is subjected to substantially pure shear deformation in the longitudinal direction and a combination of shear and compression deformation in a lateral and vertical direction. The spring rate of each body mount is substantially less in the longitudinal direction than in the vertical or lateral directions so that fore and aft force inputs on the frame are isolated from the body. Reinforcement members extend between the bulkhead structure and the radiator support member at their respective lower ends to stiffen the front end sheet metal against motion relative the unitary frame-body. A shock absorber acts between each side rail of the sub-frame and the reinforcement members to dampen resonant fore and aft movement of the sub-frame relative the body. The body mounts preferably provide a spring rate approximately three times higher in the lateral and vertical directions than in the longitudinal direction.

2 Claims, 6 Drawing Figures

BODY MOUNT SYSTEM FOR A MOTOR VEHICLE

The invention relates to an improved system for mounting a vehicle body on a vehicle frame.

In the past, most automobiles included a chassis including a frame having laterally spaced side rails which extended the entire length of the automobile with the rear axle mounted towards one end of the frame and the front suspension mounted toward the forward end of the frame.

Automobiles of more modern manufacture commonly employ a unitary frame-body wherein a plurality of sheet metal body panels, reinforcement members, and brackets are welded together to provide an integral body and frame structure which defines a passenger compartment. The rear axle is commonly bolted directly to this unitary frame-body. The forward end of the unitary frame-body is defined by a bulkhead structure which is also commonly known as the fire wall and separates the passenger compartment from the engine compartment. The front suspension in this type of vehicle is ordinarily mounted on a sub-frame which includes laterally spaced side rails which extend from the radiator support member at the front of the automobile to generally midway the length of the unitary frame-body somewhat short of reaching the rear axle. The radiator support member extends transversely between the forward ends of the sub-frame side rails. Front fenders extend between the front bulkhead structure of the unitary frame-body and the radiator support member and cooperate therewith to define the engine compartment. Connections of the sub-frame with the unitary frame-body and the radiator support member are conventionally effected by elastomeric body mounts. These body mounts are typically comprised of a pair of concentric sleeves having an annular elastomeric member compressed therebetween. A bolt extends through the inner sleeve and between the sub-frame and the adjacent body member. The annular elastomeric member is compressed in the vertical direction between the body member and the sub-frame by the weight of the body and is further compressed by the relative movement between the body member and the frame during travel on a rough surface. The annular elastomeric member is compressed in the lateral and longitudinal directions when the vhicle encounters acceleration or road roughness which reduces or increases the longitudinal or lateral forces on the vehicle body. In these conventional elastomeric body mounts the spring rate of the body mount in a longitudinal direction is approximately equal to the lateral spring rate provided by the body mount while the vertical spring rate is approximately three times the lateral and longitudinal rate. The vertical and longitudinal spring rate of these conventional elastomeric body mounts are relatively high so that the sub-frame cooperates with the radiator support, the front fenders and the unitary frame-body to contribute substantial stiffness to the automobile body. While it is desirable that the sub-frame provides this stiffness, this relatively high spring rate results in force inputs into the body and hence can result in a rough riding automobile.

A substantial component of the ride roughness encountered on the modern highway is the presence of joints or tar strips which are commonly found between the separate panels which provide the highway surface. Each time the vehicle tire rolls over these discontinuities in the road surface, there is an instantaneous change in the rolling radius of the tire. These instantaneous changes in the rolling radius of the tire result in a relatively large fore and aft resultant force input which is communicated into the body by the relative stiffness of the elastomeric body mount.

It is an object of the invention to provide a system for mounting an automobile body on a sub-frame which provides a low spring rate in a longitudinal direction to thereby reduce ride harshness of the automobile while retaining adequate mounting stiffness in the lateral and vertical directions.

According to the invention, individual body mounts are provided to act between the radiator support and the forward end of the sub-frame side rails, between the bulkhead structure of the unitary frame-body and the center portion of the sub-frame side rails, and between the unitary frame-body and the rearward end of the sub-frame side rails. Each of these body mounts has an elastomeric element which is subjected to substantially pure shear deformation in a longitudinal direction and a combination of shear and compression deformation in a lateral and vertical direction. Accordingly, the spring rate of the body mount is substantially less in a longitudinal direction than in the vertical or lateral directions so that fore and aft force inputs on the frame are largely isolated from the body. A shock absorber acts between each side rail of the sub-frame and the vehicle body to dampen resonant fore and aft movement of the sub-frame relative the body and thereby avoid resonant shake of the body. Reinforcement members extend between the bulkhead structure and the radiator support member at their respective lower ends to stiffen the front end sheet metal against motion relative the unitary frame-body. The shock absorbers are preferably attached to these reinforcement members. The body mounts preferably provide a spring rate approximately three times higher in the lateral and vertical directions than in the longitudinal direction.

One feature of the invention is the provision of a system for mounting a vehicle body on a sub-frame to provide approximately equal spring rates in the lateral and vertical directions which are approximately three times greater than the spring rate in the longitudinal direction.

Another feature of the invention is the provision of an elastomeric mounting between a vehicle frame and a vehicle body which provides a relatively low spring rate in the longitudinal direction and a shock absorber mounted in substantially longitudinal orientation and acting between the vehicle body and the vehicle frame to dampen resonant shake between the body and the frame.

These and other features, objects and advantages of the invention will become apparent upon consideration of the specification and the appended drawings in which.

Figure 1:
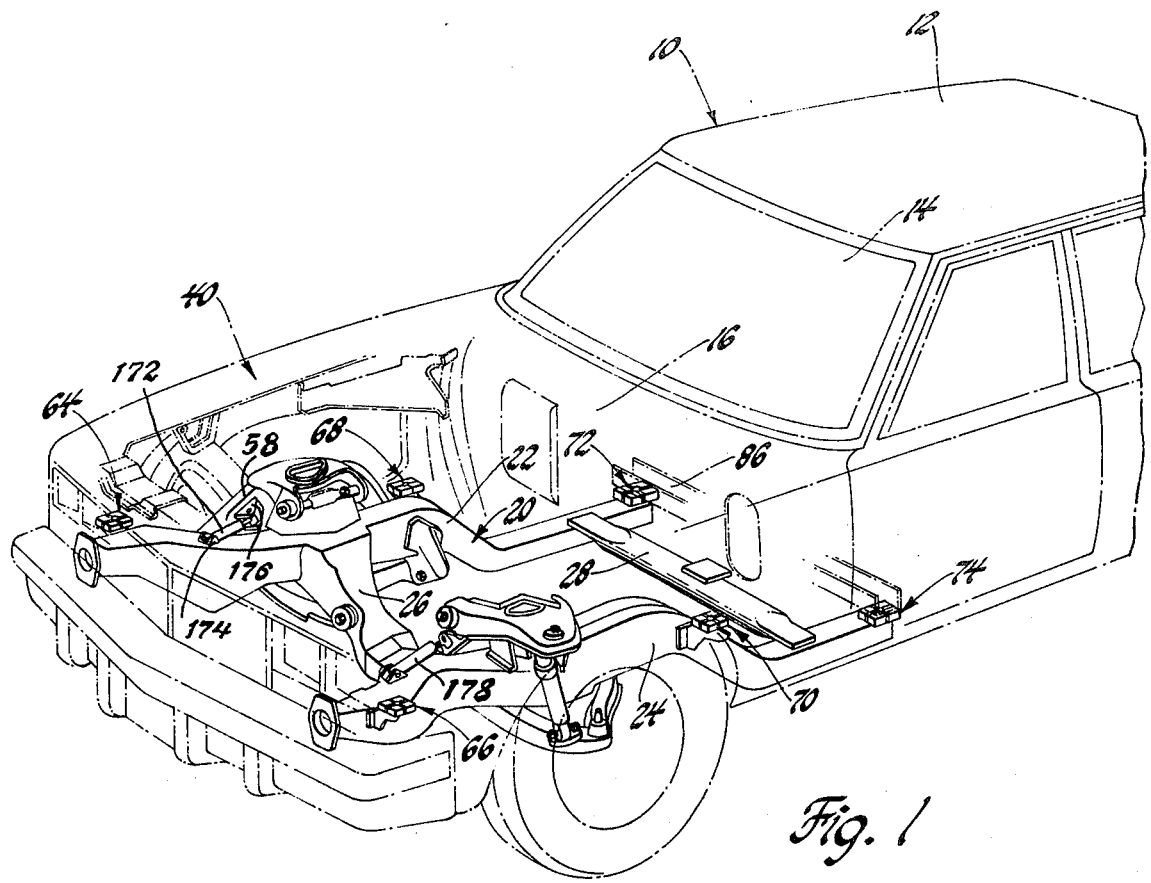
FIG. 1 is a perspective view of an automobile having parts broken away and showing a vehicle body and a sub-frame.

Referring to FIG. 1, an automobile indicated generally at 10 includes a unitary frame-body 12 which defines a passenger compartment 14. The unitary frame-body 12 is constructed of a plurality of sheet metal stamped panels and reinforcements which are conventionally welded together to provide a sufficiently strong structure to obviate the necessity of a frame running the entire length beneath the body. Accordingly, the rear suspension of the automobile, not shown, is bolted directly to the unitary frame-body instead of the vehicle frame running the entire length of the automobile. The forward end of the unitary frame-body is defined by a transversely extending bulkhead 16 which separates the passenger compartment 14 from the engine compartment.

Figure 2:
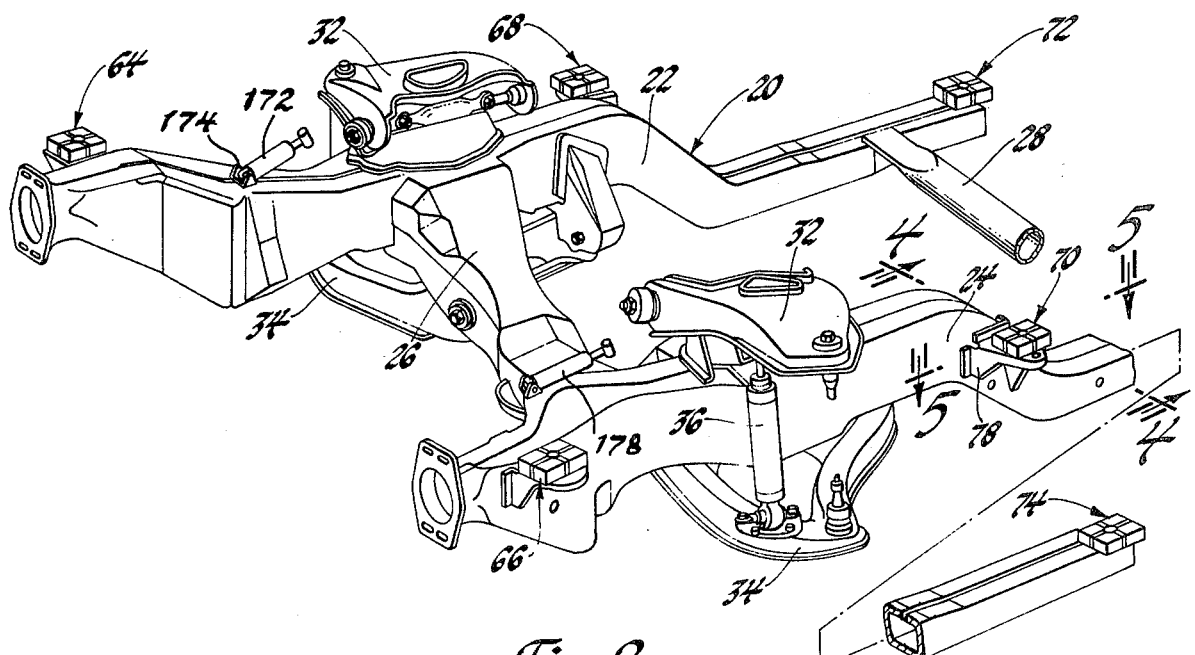
FIG. 2 is a perspective view of an automobile sub-frame.

As best seen in FIGS. 1 and 2, a sub-frame, indicated generally at 20, extends forwardly from the unitary frame-body 12. As best seen in FIG. 2, the sub-frame 20 includes laterally spaced side rails 22 and 24 which extend longitudinally of the vehicle. The side rails 22 and 24 are connected by a transversely extending engine cradle 26 and by a transversely extending transmission support 28. As best seen in FIG. 2, the conventional front wheel suspension includes upper control arms 32 and lower control arms 34 which are conventionally attached to the sub-frame 20. The control arms 32 and 34 conventionally mount a wheel spindle which in turn supports the front wheels, not shown. Conventional shock absorber 36 acts between an upward extension of the frame side rails 22 and 24 and the lower control arms 34.

Figure 3:
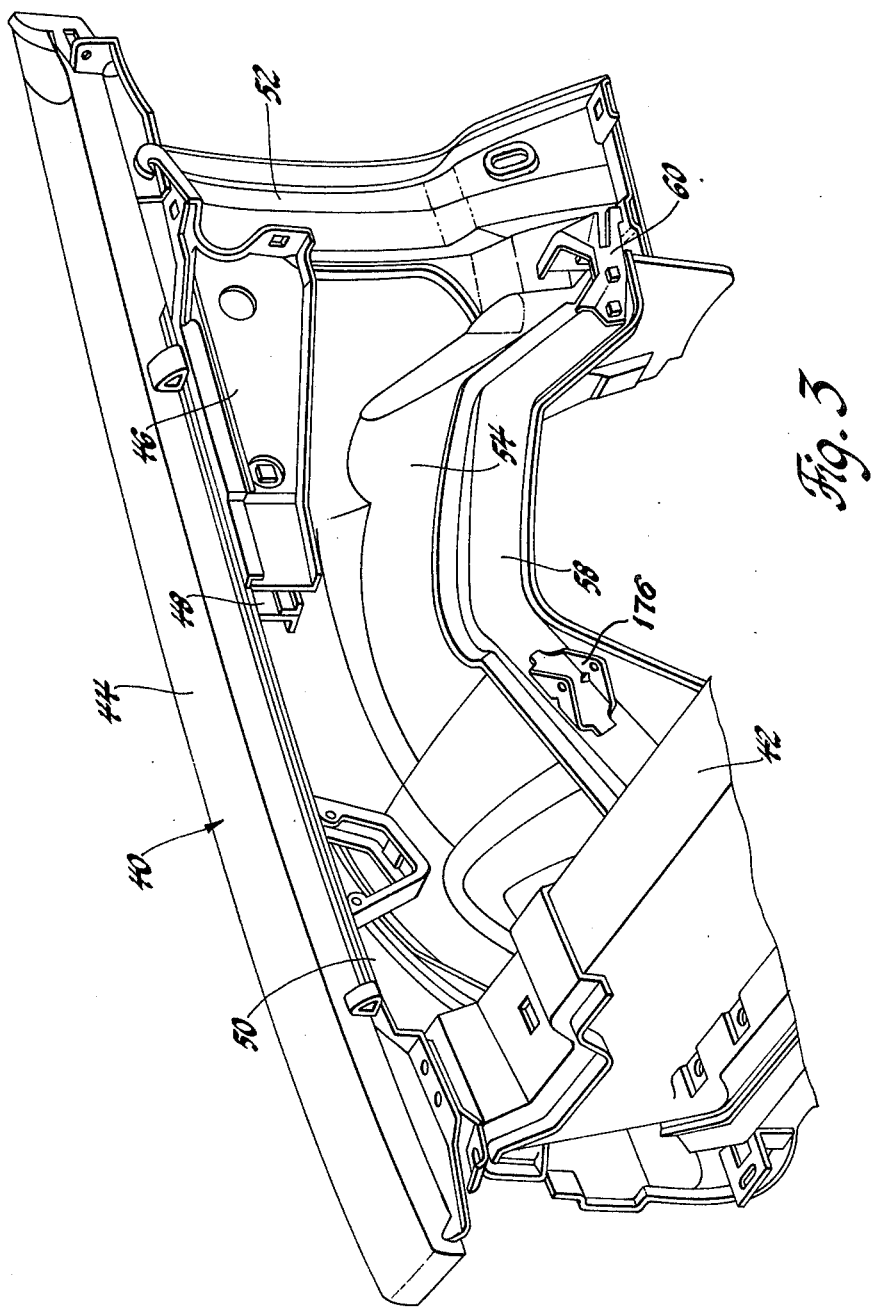
FIG. 3 is a perspective view showing the reinforced front end sheet metal of the automobile of FIG. 1.

As best seen in FIG. 1, the rearward ends of the side rails 22 and 24 extend beneath the unitary frame-body 12 for attachment thereto as will be discussed hereinafter. The front end sheet metal structure extends forwardly of the bulkhead 16 of unitary frame-body 12 and generally includes a right-hand front fender 40, left-hand front fender, not shown, and a radiator support member 42 which extends transversely of the automobile body at the forward ends of the right-hand front fender 40 and the left-hand front fender. As best seen in FIG. 3, the right-hand front fender assembly 40 includes a stamped outer panel 44 and reinforcing brackets 46, 48 and 50 which extend longitudinally of the outer panel 44 and are welded thereto. A vertical reinforcement member 52 extends vertically at the rearward end of the front fender assembly 40 and is welded to the outer front fender 44. A wheel housing 54 is conventionally bolted to the outer front fender 44 and overlies the front wheels to prevent the tires from throwing water, snow, dirt and other foreign matter into the engine compartment. The radiator support 42 extends transversely of the automobile and has its ends respectively bolted to the right-hand front fender assembly 40 and the left-hand front fender assembly, not shown. A reinforcement member 58 is preferably a stamping of channel cross section having its rearward end attached to the bulkhead 16 of the unitary frame-body 12 by bracket 60 and having its forward ends similarly attached to the lower end of the radiator support 42. The right-hand front fender assembly 40, the radiator support 42, the left-hand front fender assembly, not shown, and the reinforcement member 58 cooperate to define a rigid front end sheet metal structure which is bolted to the bulkhead 16 of the unitary frame-body 12 with sufficient rigidity to prevent structural shake of the front end sheet metal.

As best seen in FIG. 1, a plurality of body mounts are provided which connect the sub-frame 20 to the automobile body. Front body mounts, indicated generally at 64 and 66 respectively, connect the side rails 22 and 24 of the sub-frame 20 with the radiator support member 42. Center body mount assemblies, generally indicated at 68 and 70 respectively connect the sub-frame side rails 22 and 24 with the bulkhead 16 of unitary frame-body 12. Rear body mount assemblies 72 and 74 respectively connect the side rails 22 and 24 with the floor structure of the unitary frame-body 12.

Figure 4:
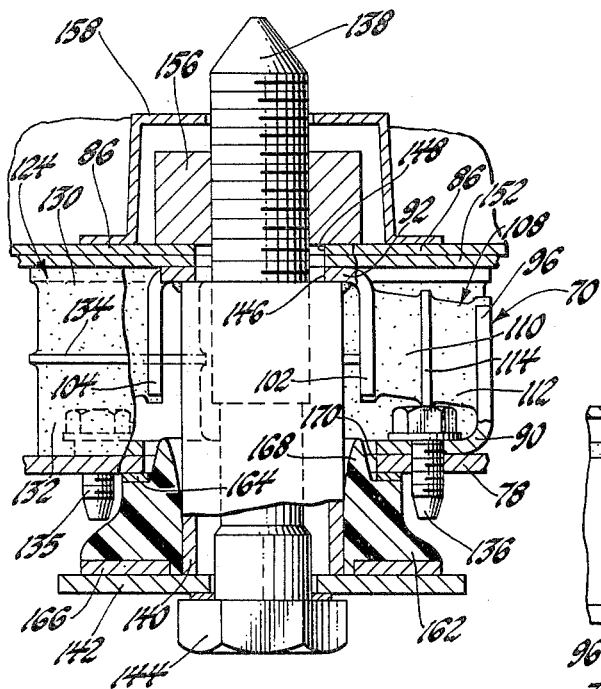
FIG. 4 is a view of an elastomeric body mount according to the invention taken in the direction of arrows 4—4 of FIG. 2.
Figure 6:
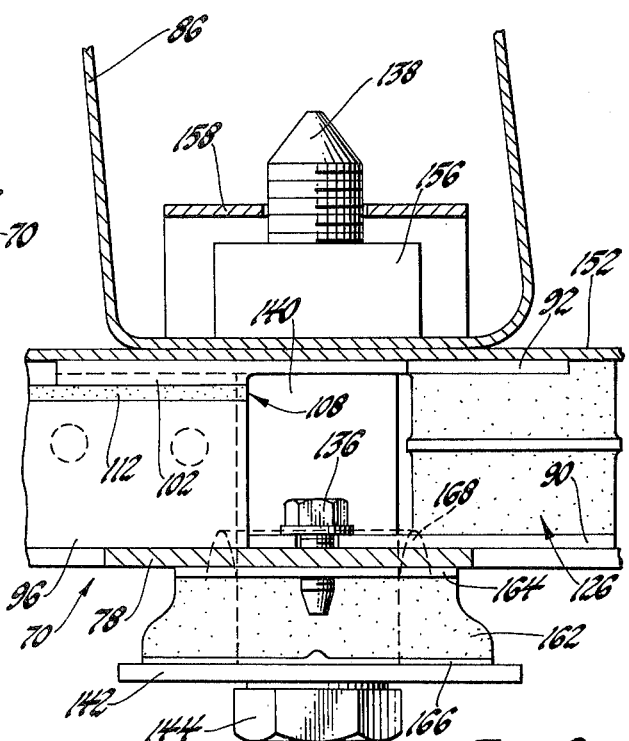
FIG. 6 is a side elevation view of elastomeric body mount according to the invention and taken in the direction of arrows 6—6 of FIG. 5.
Figure 5:
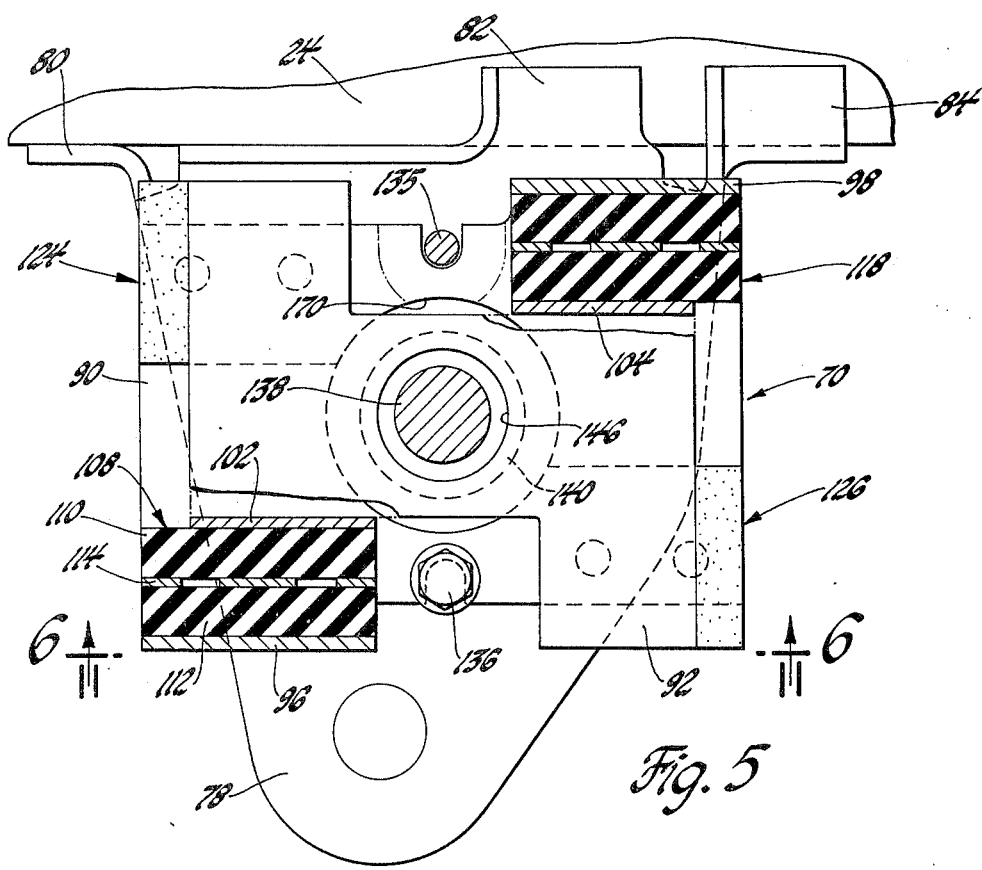
FIG. 5 is a view of the elastomeric body mount of the invention taken in the direction of arrows 5—5 of FIG. 2.

Referring to FIGS. 4, 5, and 6, the center body mount assembly 70 will be described in detail, it being understood that the other body mount assemblies, 64, 66, 68, 72 and 74 are similarly constructed. As best seen in FIG. 5, a frame bracket 78 extends laterally of the side rail 24 and has mounting tabs 80, 82, and 84 which are attached to the side rail 24 as by welding. As best seen in FIG. 6, the bulkhead 16 includes a complementary bracket 86.

The body mount assembly 70 is interposed between the frame bracket 78 and the bracket 86 of the bulkhead 16. The body mount assembly 70 includes a base plate 90 and a top plate 92. The base plate 90 has integral upstanding legs 96 and 98 which are spaced from downwardly extending legs 102 and 104 of the top plate 92. An elastomeric pad assembly, indicated generally at 108, includes elastomeric pads 110 and 112 which have their adjacent walls bonded to a shear plate 114. The elastomeric member 110 is bonded to the downwardly extending leg 102 of the top plate 92 while the elastomeric member 112 is bonded to the upstanding leg 96 of the base plate 90. An identically constructed elastomeric pad assembly 118 is interposed between and bonded to the upstanding leg 98 and the downwardly extending leg 104. As best seen by reference to FIGS. 4 and 5, the elastomeric pad assemblies 108 and 118 will be subjected to shear forces when the top plate 92 and base plate 90 are moved longitudinally relative one another. Furthermore, it will be understood that the elastomeric pad assemblies 108 and 118 will be subjected to compressive force when the base plate 90 and top plate 92 are moved laterally relative one another.

The elastomeric body mount assembly 70 also includes elastomeric pad assemblies, generally indicated at 124 and 126, which are interposed between the base plate 90 and the top plate 92. The elastomeric pad assembly 124 includes elastomeric pads 130 and 132 which have a shear plate 134 interposed therebetween and bonded thereto. The elastomeric pad 130 is conventionally bonded to the top plate 92 and the elastomeric pad 132 is conventionally bonded to the base plate 90. The elastomeric pad assembly 126 is constructed similarly to the elastomeric pad assembly 124. It will be understood that the elastomeric pad assemblies 124 and 126 support the mounting bracket 86 of the bulkhead 16 in spaced relation from the frame bracket 78. Accordingly, the elastomeric pad assemblies 124 and 126 are subjected to compressive force by the normal weight of the unitary frame-body 12 and are subjected to further compressive force in response to vertical movement between the unitary frame-body 12 relative the sub-frame when the automobile is being driven. The elastomeric pad assemblies 124 and 126 are subjected to substantially pure shear stress when the base plate 90 and top plate 92 move longitudinally or laterally relative one another.

The elastomeric body mount assembly 70 is attached to the frame bracket 78 by bolts 135 and 136 which connect the base plate 90 with the frame bracket 78. The frame bracket 78 and the body bracket 86 are connected by a mounting bolt 138. The mounting bolt 138 is surrounded by a sleeve 140 which has its lower end engaged on a plate 142 which is seated on the head 144 of the bolt 138. The upper end of the sleeve 140 is welded to the top plate 92 of the elastomeric body mount assembly 70. The top plate 92 and the body bracket 86 have aligned apertures 146 and 148 through which the bolt 138 extends. A shim 152 is positioned between the top plate 92 and the body bracket 86 and also has an aperture through which the bolt 138 passes. The bolt 138 is threadedly engaged in a nut 156 which is captured against rotation on the body bracket 86 by a cage 158.

As best seen in FIG. 4, an annular elastomeric member 162 surrounds the lower end of the sleeve 140 and is in compression between the underside of the frame bracket 78 and the plate 142 which is engaged on the head 144 of bolt 138. A top bearing plate 164 and a bottom bearing plate 166 are bonded to the annular elastomeric member 162 and respectively bear against the frame bracket 78 and the plate 142.

It will be understood that the extent to which the bolt 138 is tightened will determine the compressive loading on the annular elastomeric member 162 as well as the compressive loading on the elastomeric pad assemblies 124 and 126 of the elastomeric body mount assembly 70. The annular elastomeric member 162 has an integral rim portion 168 which extends between the sleeve 140 and an oversize aperture 170 in the frame plate 78. The rim 168 functions as a bump stop which prevents metal-to-metal contact of the sleeve 140 with the frame bracket 78 when the vehicle experiences severe road roughness.

Referring again to FIGS. 1 and 2, a shock absorber 172 has one end attached to the frame side rail 22 by a mounting bracket 174 and its other end attached to the reinforcement member 58 by a mounting bracket 176. A like shock absorber 178 is similarly provided in connection between the frame side rail 24 and a left-hand reinforcement member, not shown. The shock absorbers 172 and 178 act between the side rails of the sub-frame 20 and the vehicle body reinforcement members to control longitudinal motion therebetween and dampen resonant fore and aft movement of the sub-frame relative the body to thereby avoid resonant shake of the body.

It has been determined that acceptable vehicle handling and ride characteristics are provided when the spring rate of the body mounts is approximately three times higher in the lateral and vertical directions than in the longitudinal directions.

Thus, the invention provides a system for mounting a vehicle body on a sub-frame and simultaneously providing a low spring rate in a longitudinal direction to reduce ride harshness of the automobile while at the same time retaining adequate mounting stiffness in the lateral vertical directions.

What is claimed is:

1. A motor vehicle comprising: a unitary frame-body defining a passenger compartment and having a front bulkhead structure, reinforced front fenders attached to the front bulkhead structure of the unitary frame-body, a radiator support member extending transversely between the reinforced front fenders at their forward ends, reinforcement members extending between the bulkhead structure and the radiator support member and attached to their respective lower ends to stiffen the fenders and the radiator support against motion relative to the unitary frame-body, a sub-frame having laterally spaced side rails extending from the radiator support to generally midway the length of the unitary frame-body, first body mounts acting between the radiator support and the side rails at the forward ends thereof, second body mounts acting between the bulkhead structure of the unitary frame-body and the side rails of the sub-frame, and third body mounts acting between the unitary frame-body and the side rails of the subframe at the rearward end thereof, each of the body mounts having an elastomeric means subjected to substantially pure shear deformation in the longitudinal direction and a combination of shear and compression deformation in the lateral and vertical directions so as to lessen ride harshness in the longitudinal direction by providing relatively less stiffness in the longitudinal direction than in the lateral and vertical directions, and a shock absorber acting between each side rail of the sub-frame and the reinforcement members to control longitudinal motion of the frame and dampen resonant shake.

2. A motor vehicle comprising: a body defining a passenger compartment and having a front bulkhead structure, a front end sheet metal structure attached to the bulkhead structure and defining an engine compartment, a frame having laterally spaced side rails extending longitudinally beneath the body and the front end structure, a reinforcement means extending between the bulkhead structure and the front end structure to stiffen the front end structure against motion relative to the body, a plurality of body mounts acting respectively between the frame and front end structure and the frame and the body at longitudinally spaced intervals, each of the body mounts having an elastomeric means subjected to substantially pure shear deformation in the longitudinal direction and a combination of shear and compression deformation in the lateral and vertical directions so as to lessen ride harshness in the longitudinal direction by providing relatively less stiffness in the longitudinal direction than in the lateral and vertical directions, and a shock absorber acting between each side rail of the frame and the reinforcement means of the front end structure to control longitudinal motion therebetween and dampen resonant shake.

* * * * *